United States Patent [19]

Ellin

[11] B 4,001,843
[45] Jan. 4, 1977

[54] PHOTOGRAPHIC CONTROL SYSTEM WITH EVALUATION CONTROL

[75] Inventor: Seymour Ellin, Chestnut Hill, Mass.

[73] Assignee: Polaroid Corporation, Cambridge, Mass.

[22] Filed: July 29, 1974

[21] Appl. No.: 492,774

[44] Published under the second Trial Voluntary Protest Program on March 9, 1976 as document No. B 492,774.

Related U.S. Application Data

[63] Continuation-in-part of Ser. No. 424,556, Dec. 13, 1973.

[52] U.S. Cl. .............................. 354/23 D; 354/50; 354/51; 354/60 A
[51] Int. Cl.[2] ........................................ G03B 7/00
[58] Field of Search ................ 354/23 D, 23 R, 50, 354/51, 60 R, 60 A

[56] References Cited

UNITED STATES PATENTS

| 3,744,385 | 7/1973 | Burgarella et al. | ............... 354/23 D |
| 3,842,587 | 10/1974 | Strauss et al. | .................... 354/23 D |

Primary Examiner—L. T. Hix
Assistant Examiner—Russell E. Adams, Jr.
Attorney, Agent, or Firm—Edward S. Roman

[57] ABSTRACT

A control system for a camera which automatically carries out an involved photographic cycle in response to the momentary depression of a start button. Under select low light level conditions, the automatic carrying out of the cycle is deferred for an operator light evaluation interval amounting to about 5 seconds. Should the operator determine to make a time exposure, the start button is depressed again to cause the camera to carry out a time exposure. An indicator arrangement may be supplied for apprising the operator of low light level conditions.

38 Claims, 9 Drawing Figures

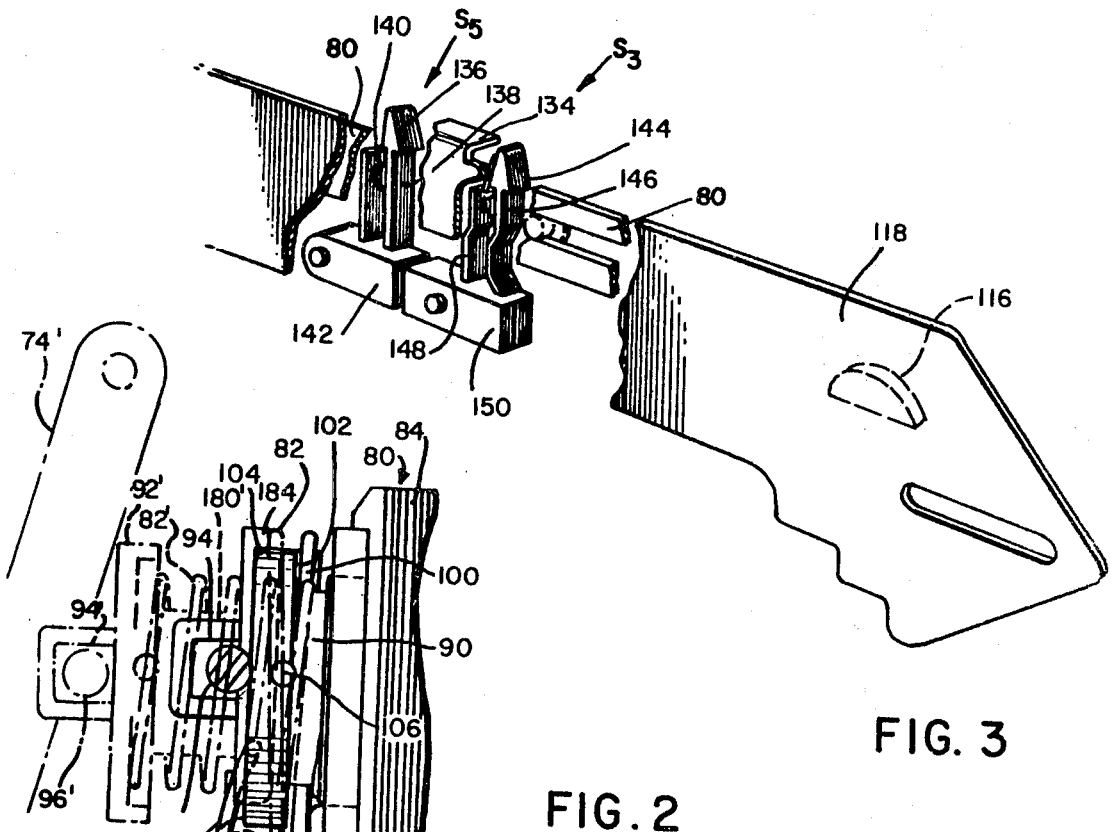
FIG. 3
FIG. 2
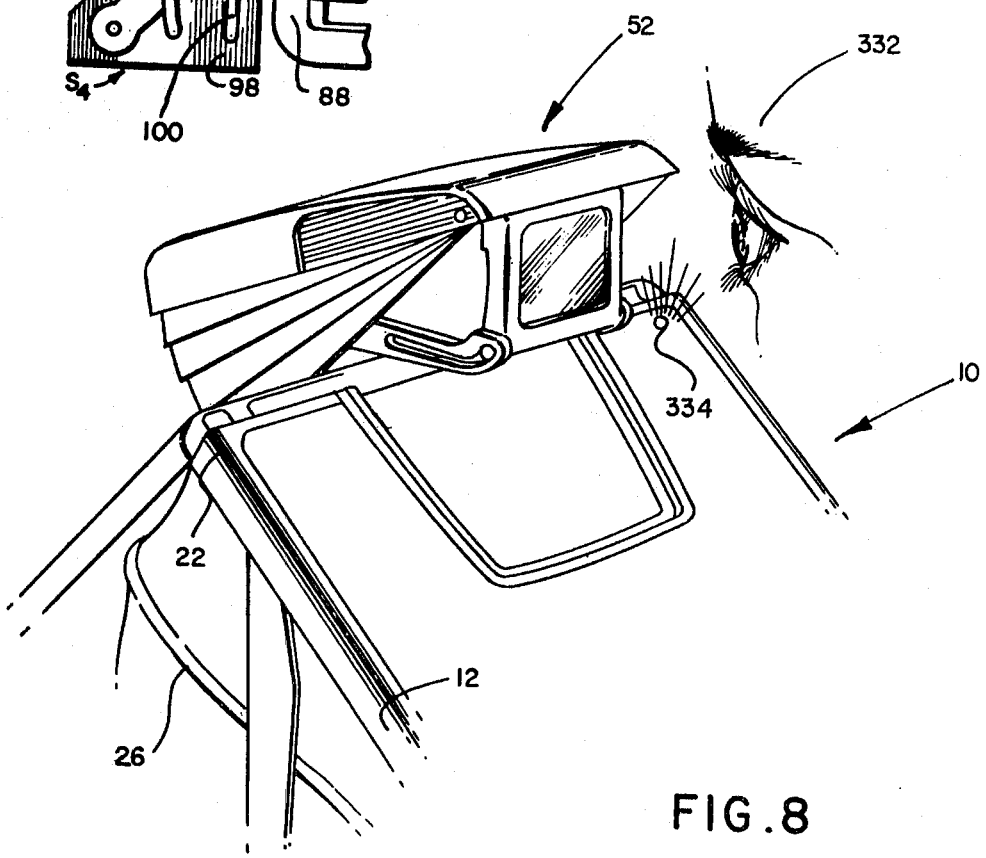
FIG. 8

FIG. 6

| EVENT SEQUENCE | GATE A SOLENOID POWER DR. | | | | GATE B SOL POWER DOWN | | | GATE C MOTOR CONTROL | | | |
|---|---|---|---|---|---|---|---|---|---|---|---|
| | a | b | c | $t_1$ | a | c | $t_2$ | a | b | d | $t_3$ |
| 1. START SWITCH CLOSED SOLENOID 80 ENERGIZED | 0 | 0 | 0 | 1 | 0 | 0 | 0 | 0 | 0 | 0 | 0 |
| 2. EXP. MECH. BLADES CLOSE $S_4$ AT C-B, MOTOR ENERGIZED, POWER DOWN | 0 | 1 | 0 | 0 | 0 | 0 | 0 | 0 | 1 | 0 | 1 |
| 3. REFLEX COMPONENT RISES, $S_5$ OPENS | 0 | 1 | 0 | 0 | 0 | 0 | 0 | 0 | 1 | 1 | 0 |
| 4. $S_3$ OPENS, DELAY INTERVAL COMMENCES | 0 | 1 | 0 | 0 | 0 | 0 | 0 | 0 | 1 | 1 | 0 |
| 5. COMMENCE EXPOSURE $S_4$ AT C-A | 0 | 0 | 1 | 0 | 0 | 1 | 1 | 0 | 0 | 1 | 0 |
| 6. TRIGGER 204 THRESHOLD REACHED EXPOSURE TERMINATES | 1 | 0 | 1 | 1 | 1 | 1 | 0 | 1 | 0 | 1 | 0 |
| 7. EXP. MECH. BLADES CLOSE $S_4$ AT C-B MOTOR ENERGIZED | 1 | 1 | 1 | 0 | 1 | 1 | 0 | 1 | 1 | 1 | 1 |
| 8. MOTOR DE-ENERGIZED $S_5$ CLOSES BRAKE ACTIVATED | 0 | 1 | 0 | 0 | 0 | 0 | 0 | 0 | 1 | 0 | 0 |

FIG. 7

| DARK SLIDE EJECTION EVENT SEQUENCE | GATES A B C D E OUTPUT STATES | | | SWITCH $S_6$ LOGIC | GATE D | | | |
|---|---|---|---|---|---|---|---|---|
| | $t_1$ | $t_2$ | $t_3$ | | b | d | e | $t_4$ |
| 1. $S_7$ CLOSED, LOADING DOOR CLOSED, $S_6$ CLOSED | 1 | 0 | 0 | 1 | 0 | 0 | 1 | 0 |
| 2. EXPOSURE MECHANISM BLADES CLOSED, MOTOR ENERGIZED | 0 | 0 | 1 | 1 | 1 | 0 | 1 | 0 |
| 3. $S_5$ OPENS | 0 | 0 | 0 | 1 | 1 | 1 | 1 | 1 |
| 4. ZERO EXPOSURE OVERRIDE | 0 | 0 | 0 | 1 | 1 | 1 | 1 | 1 |
| 5. MOTOR ENERGIZED | 0 | 0 | 1 | 1 | 1 | 1 | 1 | 1 |
| 6. $S_6$ OPENS | 0 | 0 | 1 | 0 | 1 | 1 | 0 | 0 |
| 7. $S_7$ CLOSES MOTOR DE-ENERGIZED | 0 | 0 | 0 | 0 | 1 | 0 | 0 | 0 |

PHOTOGRAPHIC CONTROL SYSTEM WITH EVALUATION CONTROL

CROSS REFERENCE TO PENDING APPLICATIONS

This application is a continuation-in-part of U.S. patent application Ser. No. 424,566 filed Dec. 13, 1973.

BACKGROUND OF THE INVENTION

U.S. Pat. No. 3,714,879 describes a single lens reflex camera which folds into a thin, compact configuration suited for carrying in the pocket of a garment. The camera is particularly characterized by its fully automatic operation. In using it, an operator views and focuses a scene to be photographed, following which a start button is lightly and only momentarily touched to cause the camera to automatically carry out a photographic cycle. This cycle includes such operational events as the securing of the exposure plane of the camera while the components thereof alter to define an exposure mode optical path. Actuation of the components to commence such path alteration is initiated by the momentary energization of an electric motor. Following such momentary energization, spring biased components carry out the noted optical path manipulation. This operation of the camera is described in U.S. Pat. No. 3,731,608. Following the development of an exposure mode orientation of the components of the camera, a light sensitive circuit therewithin regulates an exposure mechanism to define a value of exposure in accordance with scene brightness.

At the conclusion of an exposure interval, the exposure plane of the camera again is secured as the motor is energized to alter the components thereof to the initial viewing and focusing mode orientations. Simultaneously, the exposed film unit within the camera is driven through a processing station and removed from the camera for development externally thereof.

Where flash illumination is utilized in conjunction with the camera, the same operational cycle is carried out with the exception of alterations in the form of automated exposure control.

Another feature of the camera is provided in conjunction with the initial insertion of a package or cassette of film therewithin. As described in U.S. Pat. No. 3,750,551, when the film cassette is inserted within the camera and the accessing components of the camera are returned to a secured position, the uppermost dark slide component of the cassette automatically is driven from the camera.

The automatic exposure system retains the capability for carrying out time exposures extending beyond intervals of exposure suited for hand-held performance. For instance, exposures automatically may be regulated for intervals extending up to about 20 seconds. An inexperienced operator may be unaware that steady or secure camera support is needed for low light level performance or that artificial or flash illumination should be utilized under a given low light level condition. Accordingly, a technique for apprising the operator of low scene light level conditions would be helpful. However, inasmuch as a camera such as the automatic one described above is committed to the carrying out of a full cycle upon momentary depression of a start button, mere warning techniques, without more, are of marginal value. An arrangement for automatically blocking the carrying out of a photographic cycle under low light level conditions has some value. However, extended exposure interval or time exposure photography then would not be available. Lack of such a capability in a photographic device is highly undesirable. Further, where such cameras incorporate the above-noted automatic dark slide ejection feature, such feature may be hindered where film loading takes place in low light level environments.

SUMMARY OF THE INVENTION

The present invention is addressed to an exposure control system of a variety automatically carrying out an exposure cycle which, in the presence of low scene brightness levels, provides an operator option for causing the system to perform an extended interval or time exposure. Particularly suited for use with the above-described fully automatic cameras, the improved control system responds to select threshold low light level conditions to suppress the carrying out or commitment to completion of a photographic cycle. However, such cycle suppression is overridden for a select interval of time, for instance about 5 seconds. During this interval, the camera operator may determine whether to make a time exposure, utilize artificial scene illumination or to take no photograph at all. Should a determination be made to make a time exposure, the camera is again start actuated in the noted interval of evaluation. Such actuation continues the overriding of the cycle suppression feature, the camera being permitted to perform in unhindered fashion. Causing the control system to operate in a flash illumination mode also will continue overriding the cycle inhibition.

In one embodiment, a perceptible indicator is actuated or energized in the presence of low scene brightness levels when the exposure control system initially is actuated. The camera operator, therefore, immediately is apprised of scene brightness conditions and that an interval permitting decision of type of exposure to be made is underway. In one arrangement of this feature, the exposure mechanism of the camera is actuated to block the viewing optical path of a reflex viewing system simultaneously with the energization of a warning indicator light mounted upon the camera. As a consequence, the blocking out of light within the viewfinder of the camera in conjunction with the noted indicator illumination provides for a highly accentuated visibility of the indicator light.

In another arrangement of the invention, a relatively rapid succession of time exposures may be made through a technique wherein the override feature is reactivated within the interval of determination with successive start actuations of the system.

Another feature and object of the invention is to provide improvements for an exposure control system of a variety actuable to automatically carry out a photographic exposure cycle in accordance with the brightness level of a scene. The improvement incorporates a detector arrangement responsive to scene brightness and having an output condition in the presence of levels of scene brightness below a predetermined threshold level. An inhibit arrangement is provided which responds to the output condition of the detector and serves to prevent the carrying out of an exposure cycle when the inhibit function is enabled upon actuation of the system. The improvement further incorporates an override arrangement for suppressing the noted enabling of the inhibit arrangement for a predetermined interval of time following initial actuation of the entire system. This interval of evaluation preferably is in the order of about five seconds and the improvement further may include means for providing a perceptive signal in the presence of low light level conditions. The override arrangement includes a timing network responsive to initial actuation of the camera which serves to derive a predetermined output state for an interval corresponding with the noted predetermined evaluation interval. Additionally, the override arrangement may incorporate an electronic latch which responds to camera actuation for energizing the timing network during the noted interval and includes means responding to the noted output state of the timing network to suppress the enablement of the cycle inhibiting arrangement.

Another feature and object of the invention is to provide an improved control system for a reflex photographic apparatus of a variety including drive means actuable for converting an optical path between viewing and exposure orientations, an exposure mechanism which is selectively actuable to block and unblock the optical path of the camera, a control arrangement responsive to start actuation of the camera for actuating the shutter means and the drive in a manner providing a predetermined series of operational events defining a photographic cycle. This control arrangement is operative to actuate the shutter to block the optical path prior to the drive means actuation and includes a transducer having a first condition at the commencement of a photographic cycle and a second condition commencing thereafter when the optical path converts to its exposure orientation. The improvement for this system includes a detector arrangement which responds to scene brightness and develops an output condition in the presence of levels of scene brightness below a predetermined level. Additionally, the improvement incorporates an inhibit arrangement which responds to the output condition of the detector and prevents the carrying out of an exposure cycle when it is enabled. Further, an override system is provided for suppressing the inhibit arrangement for a predetermined interval of evaluation. This inhibit arrangement operates by suppressing an initial actuation of the drive system of the camera so as to prevent completion of a photographic cycle until such inhibition is removed. The override arrangement of the improvement also responds to the second condition of the transducer to continue suppression of the inhibit arrangement during that portion of a photographic cycle wherein commitment to completion of an interval of exposure has been effected. Where the camera within which the inventive system is incorporated includes an automatic dark slide ejection feature, the override arrangement of the improved control serves to continue to suppress the inhibit arrangement so as to permit the camera to carry out the dark slide ejection cycle.

Other objects of the invention will in part be obvious and will in part appear hereinafter.

The invention accordingly comprises the system possessing the construction, combination of elements and arrangement of parts which are exemplified in the following detailed disclosure.

For a fuller understanding of the nature and objects of the invention, reference should be had to the following detailed description taken in conjunction with the accompanying drawings.

BRIEF DESCRIPTION OF THE DRAWINGS

FIG. 2 is a partial pictorial representation of a switching feature of the camera of FIG. 1 with portions broken away or revealed in phantom to show internal structure and operation;

FIG. 3 is a partial pictorial representation of another switching feature of the camera of FIG. 1 with portions broken away to reveal internal structure;

FIG. 6 is a truth table or schedule of operational events performed by the control system of the camera of FIG. 1, showing, in logic form, the input and output states of gate functions incorporated within the circuit of FIG. 4 as it operates under ambient lighting conditions;

FIG. 7 is a truth table for operational events performed by the control system of the camera of FIG. 1 showing in logic form the output states of gate functions incorporated within the circuit of FIG. 4 as it operates to automatically eject a dark slide; and FIG. 8 is a pictorial representation of a portion of the camera of FIG. 1 revealing the viewing system thereof from an additional perspective.

DETAILED DESCRIPTION

Figure 1:
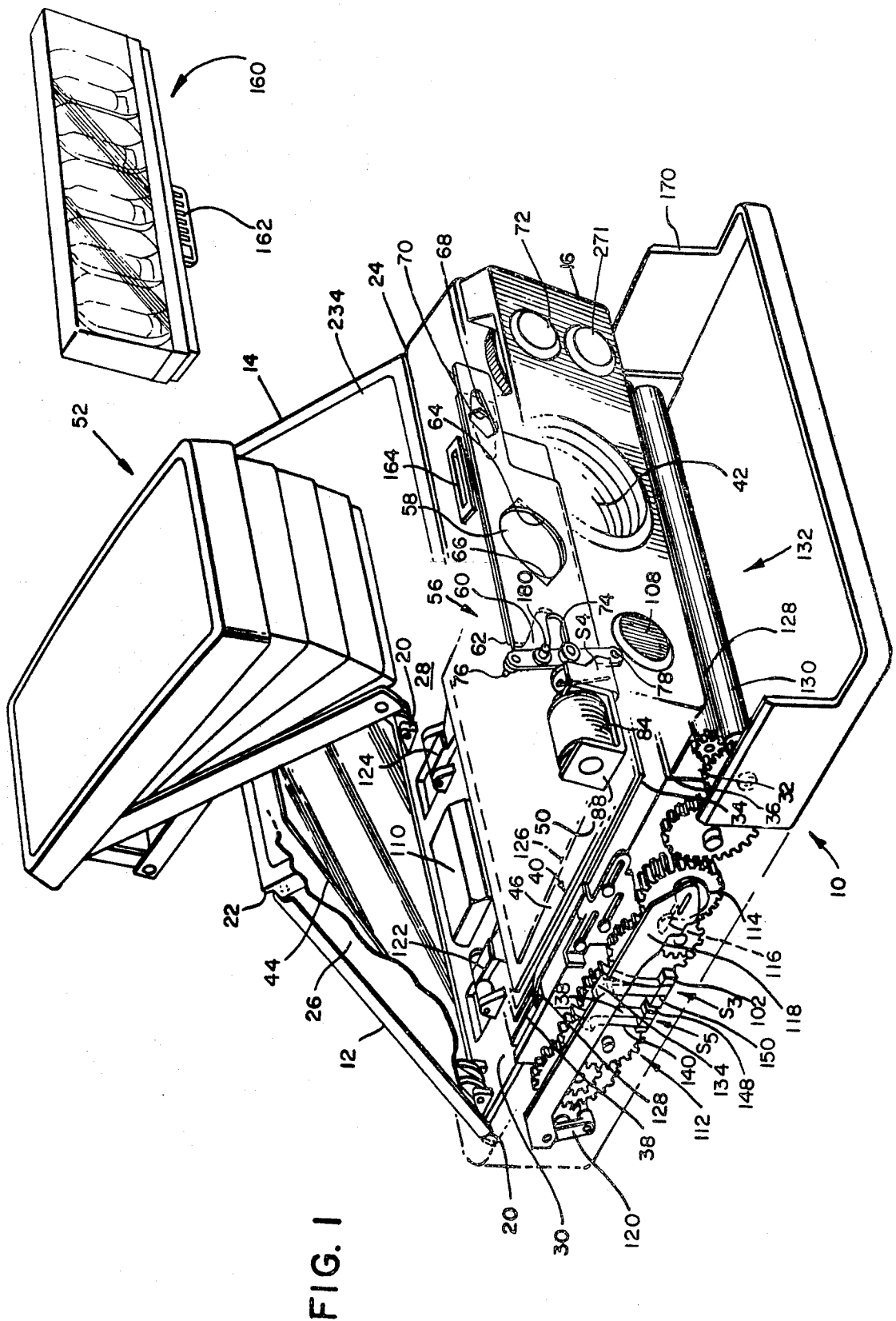
FIG. 1 is a pictorial view of a fully automatic hand-held camera incorporating the improvements of the instant invention, the view having portions broken away or removed to reveal internal structure and, in extended position, showing a source of artificial illumination which may be utilized with the camera.

Referring to FIG. 1, a highly automated single lens reflex camera which may incorporate the features of the instant invention is portrayed generally at 10. The several articulated housing components of camera 10, including rear wall 12, forward wall 14 and exposure control housing 16 are pivotally associated with a base 18 so as to be foldable thereinto in nesting fashion. When so folded from the fully erected configuration shown, camera 10 assumes a thin and compact shape suiting it to be conveniently carried, for instance in the pocket of a garment. The specific hinge connection providing for the articulated structure, while not being visible in the figure, are positioned at axes 20, 22, 24 and the lower rear portion of exposure housing 16.

When erected for photographing a scene, rear wall 12, forward wall 14 and exposure housing 16 combine in conjunction with an opaque flexible bellows, a fragment of which is illustrated at 26, to define an exposure chamber generally depicted at 28.

Base 18 includes an inner frame assembly, a portion of which is shown at 30. Inner frame assembly 30, as well as the outward portions of base 18, cooperate to provide structural support for numerous instrumentalities of the camera. For instance, frame 30 is configured to define a receiving chamber for retaining and securing a film laden cassette structure 32 at the bottom of exposure chamber 28. Cassette 32 is of generally flat, rectangular shape and contains a stacked assemblage of photographic film units (not shown). These film units are arranged for sequential presentation at a light entrance portion of cassette 32 which is defined by a ridge shown in phantom at 34. Cassette 32 also is formed having an elongate slot 36 disposed across the forward wall thereof. Slot 36 serves as an egress means providing for the sequential removal of each film unit after it has been exposed. When cassette 32 is initially inserted within camera 10, a dark slide element protecting film units stacked thereunder is present beneath ridge 34. This slide must be removed prior to the commencement of making photographic exposures. Cassette 32 also is formed having a slot or opening in the upward face thereof at 38 which permits the insertion of a component of a pick mechanism shown generally at 40. Mechanism 40 functions to impart initial movement to the film units as well as the noted dark slide as they are removed from the cassette 32.

The components of camera 10 are illustrated in orientations wherein reflex viewing and focusing may be carried out. In this regard, a taking lens 42 positioned within exposure housing 16 represents the entrance component of a viewing-focusing mode optical path. From lens 42 this path extends to a mirror 44 positioned against the inner side of rear wall 12. The path is reflected from mirror 44 to a viewing surface 46 positioned over the exposure plane of the camera. Surface 46 is mounted upon one side of a reflex component 50 which is shown in an orientation covering ridge 34 of cassette 32 and securing the exposure plane of the camera. Viewing surface 46 is configured having a texture and optical design facilitating the focusing of the image of the scene to be photographed. This image may be viewed by the camera operator through a collapsible optical viewing assembly depicted generally at 52. A configuration suited for viewing surface 46 is described in U.S. Pat. No. 3,735,685, while the assembly 52 and its related internal components are described in detail in a copending application for U.S. patent by James G. Baker entitled "Reflex Camera And Viewing Device", Ser. No. 98,356, filed Dec. 15, 1970, and assigned in common herewith, now abandoned.

While camera 10 is in the noted viewing-focusing operational mode, the exposure mechanism thereof, shown generally at 56 within exposure housing 16, establishes an aperture opening as at 58. Aperture 58 is defined by two coacting blades 60 and 62 which slidably ride in a track (not shown) mounted within exposure housing 16. Each blade, 60 and 62, is formed having a teardrop shaped aperture opening as shown, respectively, at 64 and 66. Additionally, the blades are formed having secondary openings, shown respectively at 68 and 70, which move in synchronism with openings 64 and 66 before the detecting elements of a photosensing network positioned behind an entrance optical assembly 72. As is apparent, openings 64 and 66 are positioned for movement across the optical path of camera 10 as it is established at taking lens 42. Depending upon the position of blades 60 and 62, openings 64 and 66 symmetrically overlap to define selectively varying aperture sizes. In the viewing-focusing mode orientation illustrated, it may be noted that blades 60 and 62 define an aperture opening 58 of maximum width to facilitate viewing.

Blades 60 and 62 are moved in mutual symmetry as a result of their connection with a walking beam type actuator 74 rotatably mounted at its centerpoint within housing 16. Walking beam 74 is coupled at its uppermost tip to blade 60 by a pin connection 76, while its lower portion is coupled with blade 62 by pin connection 78.

Looking additionally to FIG. 2, the rotational movements of walking beam 74 and, in consequence, blades 60 and 62, is controllably derived from a tractive electromagnetic device present as a solenoid 80 operating in conjunction with an opening spring 82. Solenoid 80 is described in detail in a copending application of U.S. patent by C.C. Petersen entitled "Tractive Electromagnetic Device," Ser. No. 245,884, filed Apr. 21, 1972 and assigned in common herewith, and includes an excitation winding 84 which is wound about a bobbin 86 attached, in turn, to a U-shaped frame 88. A cylindrically shaped plunger 90 is slidably mounted within a corresponding central opening within bobbin 86 and a composite assembly is fixed within exposure housing 16. Opening spring 82 is mounted about plunger 90 between frame 88 and a plunger cap 92. Cap 92 is formed having a slot 94 which loosely receives a pin 96 fixed to and extending from a lower portion of walking beam 74.

With the arrangement shown, when winding 84 of solenoid 80 is energized, plunger 90 is retracted thereinto to load or compress opening spring 82 and, simultaneously, rotate walking beam 74 in a direction causing blades 60 and 62 to close aperture opening 58. Conversely, upon de-energization of excitation winding 84, opening spring 90 reversibly drives walking beam 74 to cause openings 64 and 66 of respective blades 60 and 62 to define progressively enlarging aperture openings about the optical path of the camera.

Operating in conjunction with solenoid 80 and opening spring 82 is a single-throw double-pole switch designated $S_4$. As shown in FIG. 2, switch $S_4$ is formed having an upstanding insulative base 98 fixed, in turn, to frame 88. Base 98 supports an elongate contact rod 100, the upwardly extending portion of which is configured to wipe across two separate conducting surfaces 102 and 104 formed on the inward side of base 98. Rod 100 is normally biased to move outwardly into contact with conductive surface 104. When solenoid 80 is energized and its plunger 90 is retracted, however, a pin 106 extending laterally from cap 92 drives contact rod 100 rearwardly to wipe against and make electrical contact with conducting surface 102. Conducting surfaces 102 and 104 are relatively closely spaced such that electrical contact is effected with surface 102 when plunger 90 is closely proximate its fully retracted and seated position. Conversely, contact rod 100 effects electrical contact with conducting surface 104 very rapidly upon the energization of solenoid 80. The retracted orientation of spring 82 and cap 92 is shown in FIG. 2 in solid line fashion, while their extended positions under a de-energized state of winding 84 is shown with the identical numeration marked with a prime ('). A detailed description of the solenoid driven exposure mechanism shown at 56 is presented in a copending application for U.S. patent by C. H. Biber entitled "Pneumatically Reactive Exposure Control System" filed Apr. 11, 1973, Ser. No. 349,960 and assigned in common herewith.

Returning to FIG. 1, operator actuation of camera 10 to commence a photographic cycle following viewing and focusing is carried out by exertion of a momentary and slight pressure upon a start button shown mounted upon exposure housing 16 at 108. Start button 108 is an "oil can" variety of switch being normally biased to an open circuit orientation.

Momentary actuation of button 108 will cause the energization of solenoid 80 and consequent closure of blades 60 and 62 to secure exposure chamber 28. In response to a signal from switch $S_4$ that blades 60 and 62 have blocked the optical path of the camera, a DC motor 110 positioned upon inner frame 30 at the rearward portion of the camera is energized to drive a gear train shown generally at 112 extending along one side of base 18. As gears within train 112 are rotated, a cycle phase cam 114 is rotated. Cam 114 is designed for driving contact with a cam follower 116 which, in turn, is fixed to the inward side of ram 118. Ram 118, in turn, is connected through a bell crank 120 to a drive spring system (not shown). That drive spring system, in turn, serves to bias reflex component 50 to pivot about hinges 122 and 124 into a position abutting or closely proximate mirror 44 at the inward side of rear wall 12. Actuation of this drive arrangement is carried out by rotating cam 114 a distance sufficient to release follower 116 such that the spring drive moves ram 118 forwardly and reflex component 50 upwardly. When component 50 is seated against the inner side of rear wall 12, a second mirror 126 is positioned to intercept light within the optical path of taking lens 42 and redirect it to the exposure plane of the camera. For typical ambient operation, solenoid 80 is then de-energized to permit spring 82 to drive blades 60 and 62 to define progressively varying aperture values about the optical path of the camera. A light sensing network positioned behind entrance optics 72 evaluates scene brightness and defined aperture valuations to provide a command signal which is utilized to effect the re-energization of solenoid 80 and the consequent closure of blades 60 and 62 to terminate an interval of exposure. Solenoid 80 remains energized following the exposure interval and motor 110 again is energized to drive gear train 112. The consequent rotation of cam 114 moves ram 118 rearwardly to, in turn, cock the mirror erecting spring system and move reflex component 50 into its exposure plane securing orientation. Simultaneously with this activity, pick mechanism 40 is actuated to urge the exposed film unit forwardly through slot 38 in cassette 32 and into the bite of rolls 128 and 130 of a processing station 132. Power for rotation of these rolls is derived from gear train 112 by connection with roll 128. A detailed description of the optical path conversion mechanism and drive for processing station 132 is provided in the noted U.S. Pat. No. 3,714,879.

Looking additionally to FIG. 3, the arrangement for actuating two switches designated $S_3$ and $S_5$ during the movement of ram 118 is revealed in more detail. As ram 118 commences forward movement in conjunction with the noted release of reflex component 50, tab 134 extending inwardly from the midportion of ram 118 releases from engagement with the insulative cap 136 of a resilient leaf 138 of switch $S_5$. Switch $S_5$ additionally includes a resilient leaf 140 which is supported along with leaf 138 from an insulative base 142 fixed to base 18 of camera 10. Accordingly, the contacts represented by leaves 138 and 140 of switch $S_5$ are opened substantially in synchronism with the initial movement of component 50 from its viewing or exposure plane position. This represents a particular signal condition of the switch which is maintained until photographic cycle termination.

The spring bias rotational travel of reflex component 50 about its hinges 122 and 124 from its seated exposure position entails about 37°. When reflex component 50 somewhat closely approaches this seated position against rear wall 12 and mirror 44, or at about 32° of rotation, tab 134 contacts the insulative cap 144 of a resilient leaf 146 of switch $S_3$. Leaf 146 normally is in contact with a second leaf 148 of the switch and both leaves are supported from an insulative base 150, also fixed to camera base 18. Serving to monitor the movement of reflex component 50, the open contacts of switch $S_3$ provide a signal condition evidencing that the component 50 has approached its seated position against rear wall 12. During the post-exposure operation of camera 10 and the consequent driven movement of ram 118 in a rearward direction, tab 138 releases from engagement with cap 144 of switch $S_3$ to permit it to close and, additionally, re-engages cap 136 of switch $S_5$ to close it. The latter closure of switch $S_5$ provides a signal condition utilized to terminate energization of motor 110 as well as the energization of solenoid 80.

Flash illuminated pictures may be taken with camera 10 utilizing a packaged linear array of flashlamps as shown at 160 in FIG. 1. Array 160 is formed having five flashlamps along with corresponding reflectors facing outwardly from each face thereof. The five flashlamps are connected by printed circuitry or the like to a downwardly extending mounting blade as at 162. Each side of blade 162 is formed having conductive surfaces which serve as terminals leading to each flashlamp and, additionally, the mount is configured having a conductive surface unconnected with the flashlamps which serves a switching function by interconnecting appropriate circuit leads within the camera to cause it to carry out a flash cycle. Connection with the circuitry of camera 10 is made upon inserting blade 162 of array 160 into a mount 164 positioned upon the top surface of exposure housing 16.

When operated in a flash operational mode, the exposure control system of camera 10 may utilize other forms of exposure regulation. One such regulating technique is described in copending application for U.S. patent by L. M. Douglas, entitled "Apparatus and System for Flash Photography", Ser. No. 168,671 filed Aug. 3, 1971 and assigned in common herewith now abandoned. With the system described therein, flash exposure control is based upon a follow-focus arrangement wherein aperture is established in correspondence with focal distance and the light anticipated at the subject. To carry out such regulation, blades 60 and 62 are interrupted mechanically during their opening movement at a position corresponding with focus setting.

As described in U.S. Pat. No. 3,750,551, camera 10 also may incorporate a feature wherein a dark slide or film cover associated with the cassette 32 is automatically removed from the camera when the cassette is inserted within a receiving chamber within inner frame 30. Access to this receiving chamber is provided through a loading door 170 which is pivotally hinged to the forward portion of base 18. Door 170 supports the roll components of processing station 132 and may be pivoted downwardly to provide for the insertion and removal of a cassette. The switching logic involved in providing for dark slide removal includes an interlock switch (not shown) which is closed upon erection of camera 10 in the orientation shown in FIG. 1. Further, as described in U.S. Pat. No. 3,760,701, a delayed action switch responding to the movement of loading door 170 provides operational logic to cause camera 10 to automatically eject a dark slide. This dark slide removal switching logic is described in more detail in connection with FIG. 4.

Referring to FIGS. 4, 5, 5A and 6, a schematic diagram for a control circuit suited to regulate the instrumentalities of camera 10 as well as a block logic diagram and truth tables are revealed. The circuit of FIG. 4 includes a series of multi-function GATES designated A–D. The inputs and outputs for these GATES are depicted in Boolean enumeration in the truth tables of the drawings. For purposes of facilitating an understanding of the tabulations within the truth tables as well as the description of the circuit diagram, when the inputs or outputs of the listed components are at ground reference potential, they are referred to as "low" and, additionally, such input or output may be digitally identified as "0". Conversely, when these inputs and outputs assume or approach the voltage status of the power supply of the control circuit, they are referred to as being "high" and are given the binary designation "1". Further, certain of the gate input terminals receive common signals. These common signal terminals are identified by the letters "$a$–$e$". Additionally, the outputs of GATES A–D are identified, respectively, by the letters "$t_1$–$t_4$".

In the discourse to follow, the control circuit of camera 10 initially is described as the camera is operated in an ambient illumination mode as it may be affected by the low light level logic system of the invention. Following this presentation, the dark slide ejection feature as well as general flash mode operation of the circuit are described as they relate to the low light level logic system.

Figure 4:
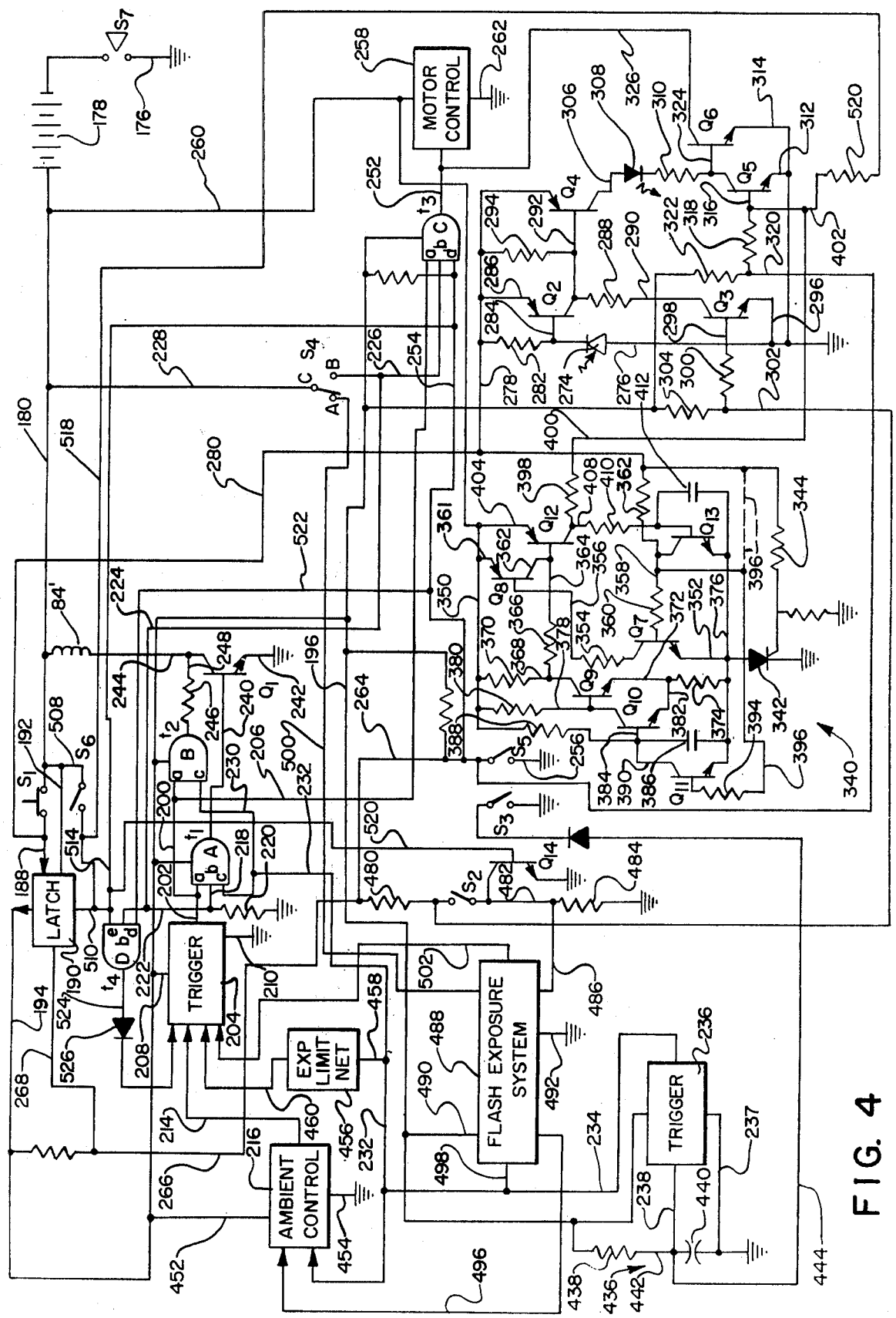
FIG. 4 is a schematic diagram of a control circuit used in conjunction with the control system of the camera of FIG. 1.

As described earlier, when camera 10 is unfolded into its erected configuration as shown in FIG. 1, an interlock switch designated $S_7$ and located in main power lead 176 is closed to enable a battery power supply 178 to power the entire circuit from power lead 180. The components of camera 10 are now in a viewing-focusing mode orientation, and as shown, respectively, at blocks 182 and 184 of FIG. 5, exposure mechanism blades 60 and 62 are fully opened and the exposure plane of the camera is blocked by virture of the positioning of relfex component 50. To commence an exposure, start button 108 is lightly depressed for a short interval. As is depicted at block 186 in FIG. 5, and as shown in FIG. 4, this momentary depression serves to close a switch designated $S_1$. Switch $S_1$ is connected between lines 180 and 188 and, when closed, serves to energize or drive a latching network depicted functionally at block 190. Described in detail in U.S. Pat. No. 3,744,385, network 190 operates under two energization states. The first of these states permits the operator of camera 10 to abort a photographic cycle until such time as switch $S_5$ is opened. Following the opening of switch $S_5$ a second energization state at network 190 permits a continuous powering of the circuit from lines 180 and 192 even though the contacts of switch $S_1$ are separated.

The output of latching network 190 is present at a power distribution line 194 which, in turn, is connected to a branch power line 196. These two lines serve to power and assert initial control conditions over the various GATES and components within the entire circuit. These conditions, as they exist at the commencement of an ambient illumination photographic cycle, are tabulated at Event No. 1 in FIG. 6. As shown at function block 198 in FIG. 5, the normally first operational event of the photographic cycle is that of energizing winding 84 of solenoid 80. This winding is indicated at 84' in FIG. 4. Energization of winding 84 is carried out by asserting select input conditions to the input terminals of multi-function GATES A and B. Looking to these inputs, input terminals $a$, commonly connected by lines 200 and 202 exhibit an initial low status as a consequence of the connection of line 202 with the output of a trigger circuit depicted generally at 204. Common input terminal $a$ of GATE C also is coupled with line 200 through line 206 so as to derive an appropriate low input at that GATE.

Trigger 204 may be of a conventional design, for instance, a Schmitt-type having a normally conducting output stage and a normally non-conducting input stage. These stages operate to reverse their conductive states very rapidly upon receipt at the input stage of a signal which is at least equal to a predetermined triggering reference or threshold level. Energized from power line 194 through line 208 and coupled to ground through line 210, the output at line 202 of trigger 204 remains low until a signal above the noted triggering reference level is received at any of its input lines. Upon receipt of such signal, the output at line 202 assumes a high status. Typically, such input is developed at line 214 from an ambient exposure control circuit depicted functionally at block 216. Enabled at an appropriate later point in a photographic cycle, control 216 evaluates scene lighting utilizing a photodetecting device located behind entrance optics 72 within exposure housing 16 (FIG. 1).

Gate input terminal $b$ of GATE A evidences a low state by virtue of its connection through line 218 and pull-down resistor 220 to ground. Line 218 is also coupled through lines 222, 224 and 226 to a corresponding input gate terminal $b$ of GATE C. Line 226 also extends to one contact of switch $S_4$. Switch $S_4$ corresponds with that described in conjunction with FIG. 2 and is shown having a common terminal "C" corresponding with contact rod 100 as well as alternate contacts "A" and "B", the latter contact being coupled to line 226. When switch $S_4$ assumes condition "C-A", it is considered to be in an orientation wherein the contact rod 100 is in contact with outwardly disposed contact surface 104 (FIG. 2). Under such conditions, blades 60 and 62 will be in some open or aperture defining orientation. When switch $S_4$ assumes condition "C-B" it is considered to be in the orientation described wherein contact rod 100 is in contact with conducting surface 102, blades 60 and 62 assuming a fully closed orientation. Inasmuch as switch $S_4$ is normally in the C-A condition at the commencement of a photographic cycle, line 226 remains low. At such time as switch $S_4$ assumes a C-B condition, line 226 is energized through line 228 to alter the status of common input terminals $b$ to a high state. Gate input terminal $c$ of GATE A is coupled through line 230 to the corresponding common input terminal of GATE B. The initial low status of common input terminals $c$ is derived as a result of the connection of line 230 through lines 232 and 234 to the output of a trigger 236. Trigger 236 is powered from line 196 and is coupled to ground through line 237. Similar to trigger 204, the output of trigger 236 is normally low and will assume a high status in response to the receipt of a signal of a predetermined triggering threshold value at its input line 238. Trigger 236 operates to retain common input terminals $c$ at this low state during the pre-exposure phase of a photographic cycle.

With the assertion of the above-described input logic, the resultant output, $t_1$ of GATE A present at line 240 is high and is imposed at the base of an NPN transistor $Q_1$. The emitter of transistor $Q_1$ is coupled along line 242 to ground while its collector is connected to line 244. Line 244, in turn, connects the excitation winding 84' of solenoid 80 to power line 180. The high status at line 240 serves to forward bias the base-emitter junction of transistor $Q_1$, thereby energizing winding 84' to cause exposure mechanism blades 60 and 62 to commence to move to block the optical path of camera 10. The output $t_2$ of GATE B is low at the commencement of a photographic cycle and is coupled through a current limiting resistor 246 and line 248 to line 244. GATE B serves a powering down function wherein solenoid 80 is energized at a lower current level when the plunger thereof approaches its fully retracted position. To carry this out, GATE B diverts solenoid energizing current through limiting resistor 246. When transistor $Q_1$ is forward biased, however, this diversion through resistor 246 is insignificant.

Figure 5:
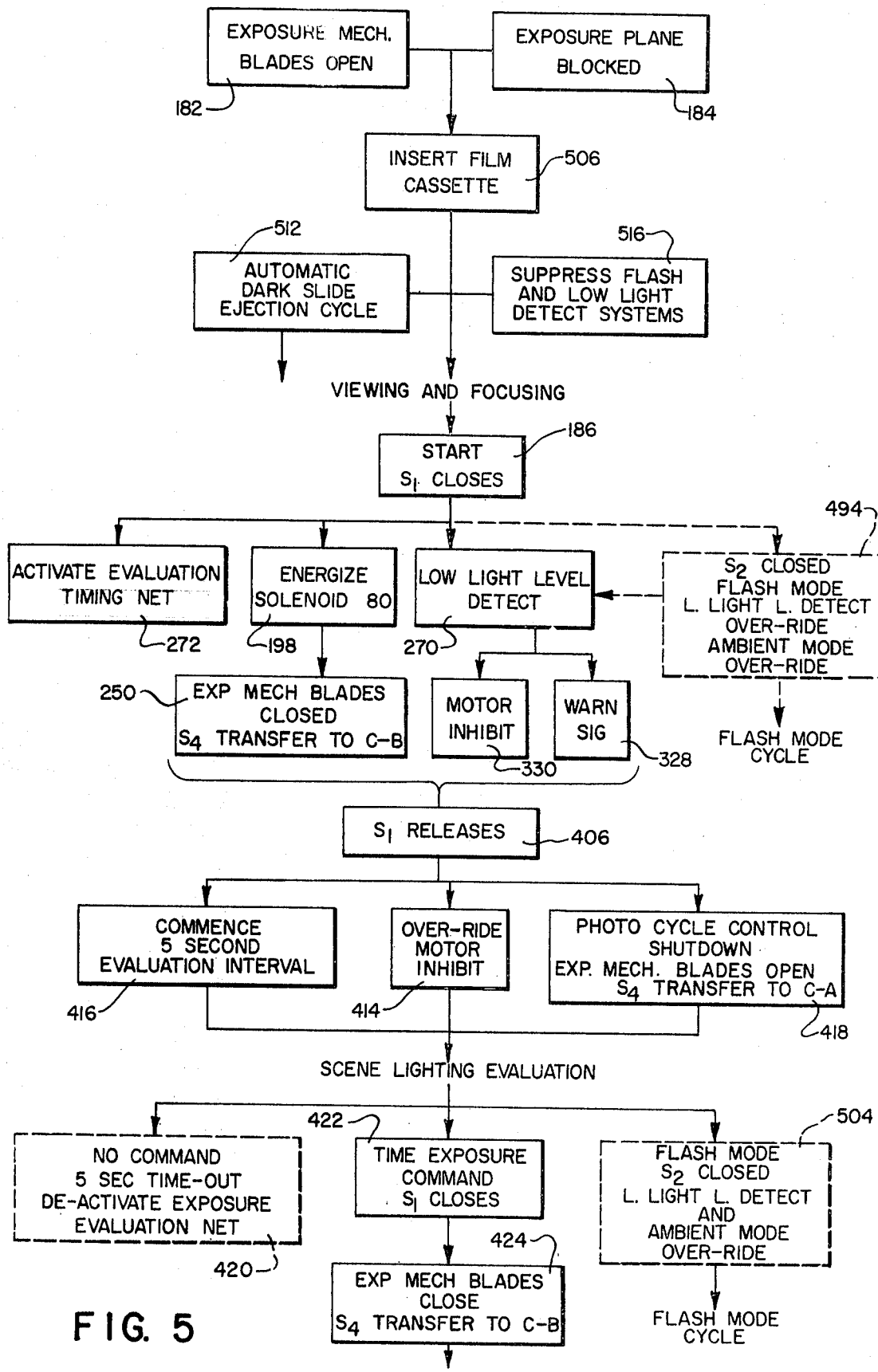
FIGS. 5 and 5A combine to form a block logic diagram showing the sequence of events occurring during operational cycles of the camera of FIG. 1, the topmost portion of FIG. 5A being intended for attachment with the lowermost portion of FIG. 5.

As shown at block 250 in FIG. 5, and displayed at Operational Event 2 in FIG. 6, as blades 60 and 62 reach their closed terminal orientations, the contacts of switch $S_4$ transfer to derive a C-B condition. This condition for switch $S_4$ alters the $b$ input terminal state at line 218 from a low to a high to, in turn, cause the output $t_1$ of GATE A to become low. In consequence, the forward bias at transistor $Q_1$ is removed and the power-down energization of winding 84' ensues.

The transfer of switch $S_4$ to a C-B condition also alters the output $t_3$ of GATE C. Prior to such switch transfer, the output $t_3$ at line 252 is low. This low output of GATE C is established by virtue of the low states of common input terminals $a$ and $b$ as well as a low value for common input terminal $d$. Gate input terminal $d$ of GATE C remains low in consequence of its connection through lines 254, 264 and closed switch $S_5$ to ground. With the transfer of the switch $S_4$ common contact to a C-B orientation and the consequent alteration of common input terminal $b$ to a high value, the output $t_3$ of GATE C converts to a high state which, without more, would effect the actuation of a motor control function 258. Control 258 is coupled with main power lead 180 through line 260 and to ground through line 262. Described in detail in a copending application for U.S. patent by J. J. Abbadessa entitled "Photographic Apparatus With Precision Motor Control" Ser. No. 299,667, filed Oct. 24, 1972, and assigned in common herewith, motor control function 258 serves to energize motor 110 (FIG. 1) to cause gear train 112 to commence to rotate cycle phase cam 114. As described in connection with FIGS. 1 and 3, such rotation will continue until ram 118 releases under spring drive to cause the opening of switch $S_5$ and elevation of reflex component 50. With this release of ram 118, camera 10 is committed to the completion of an exposure cycle. Further, it may be noted that switch $S_5$ provides a unique closed signal condition prior to an exposure interval and a unique open condition during and following that exposure interval.

As disclosed at Event No. 3 in FIG. 6, the opening of switch $S_5$ alters the status of input terminal $d$ of GATE C to a high condition which, in turn, serves to alter the output $t_3$ of GATE C to a low state. As a consequence, motor control function 258 de-energizes and brakes motor 110 (FIG. 1). Recall that when ram 118 is driven forwardly, reflex component 50 is spring driven towards its exposure orientation against the back wall 12 of camera 10.

The alteration of the status of common input terminal $d$ also serves to signal latching network 190 to assume its second energization state by virtue of its connection with input line 254 through lines 264, 266 and 268. As noted above, this second energization state commits the camera to carry out a full photographic cycle even though switch $S_1$ will have been released and is open.

Returning momentarily to FIG. 5, the initial closure of switch $S_1$ also serves to activate a low light level detection network as depicted at block 270 and an evaluation timing network as shown at block 272. Function 270 utilizes a light sensitive element positioned within exposure housing 16 of camera 10 behind entrance optics as revealed at 271 (FIG. 1). Entrance optics 271 are arranged so as to cause the light sensitive element to respond to the brightness levels within a field of view corresponding with that of entrance optics 72.

Returning to FIG. 4, the light sensing element utilized for the instant purpose is present as a light sensitive diode such as a silicon diode 274. Connected within line 276 such that its anode is coupled to ground and its cathode to line 188 through lines 278 and 280, diode 274 functions to generate current flow in correspondence with scene brightness levels witnessed. Through appropriate selection of a diode as well as resistor 282, diode 274 operates to generate currents below a predetermined threshold value when brightness levels fall below a corresponding predetermined threshold value. That value may be selected as corresponding to intervals of exposure defined by the exposure control system of the camera which require more steady support than merely hand-held. In normal applications, supplementary camera support is required at exposure intervals extending beyond about 1/30 of a second.

The cathode side of diode 274 is connected through line 284 to the base of a PNP transistor $Q_2$. The emitter of transistor $Q_2$ is coupled through line 286 to line 278, while its collector is connected through resistor 288 and line 290 to the collector of an NPN transistor $Q_3$. The collector of transistor $Q_2$ also is coupled through line 292 to the base of PNP transistor $Q_4$. Line 292 also is connected through resistor 294 to line 278.

The emitter of transistor $Q_3$ is coupled to ground through lines 296 and 276, while its base is connected through line 298 and resistor 300 to line 302. Line 302, in turn, connects line 298 through resistor 304 to branch power line 196.

The emitter of transistor $Q_4$ is connected to line 278, while its collector is connected to line 306. Line 306, in turn, is coupled through a light emitting diode (LED) 308 and resistor 310 to the collector of NPN transistor $Q_5$. The emitter of transistor $Q_5$ is connected through line 312 which, in turn, is connected through line 314 to line 276. The base of transistor $Q_5$ is connected through line 316 and resistor 318 to line 320. Including resistor 322, line 320 extends to connection with line 302 at a point above resistor 304. The collector side of transistor $Q_5$ at line 306 also is coupled through line 324 to the base of NPN transistor $Q_6$. The emitter of transistor $Q_6$ is coupled to line 314, while its collector is coupled through line 326 to output line 252 of GATE C.

With the arrangement thus described and as depicted at blocks 328 and 330 in FIG. 5, under the noted low light level conditions, diode 274 will develop only a small current flow such that transistor $Q_2$ is not forward biased. However, with the depression of switch $S_1$, transistor $Q_3$ is forward biased by virtue of the activation of branch power line 196. As transistor $Q_3$ conducts, transistor $Q_4$ may be drawn into conduction. Simultaneously with the close of switch $S_1$, transistor $Q_5$ is reverse biased as a result of the coupling of its base to ground through lines 316, 320 and switch $S_5$. As a consequence of the activation of transistor $Q_4$ light emitting diode 308 is energized to provide the warning signal described in connection with block 328 of FIG. 5. The activation of line 306 through transistor $Q_4$ also serves to forward bias transistor $Q_6$. This forward biasing provides for diverting the high signal at output line 252 of GATE C to ground, thereby inhibiting the actuation of motor control 258. In consequence, motor 110 is not energized and the photographic cycle will not continue.

Looking momentarily to FIG. 8, a rear perspective view of camera 10 is revealed. Under the above-described low light level conditions, the operator eye station as at 332 will be oriented to look into viewing and focusing optics 52. However, shutter blades 60 and 62 will have been driven to a fully closed orientation such that darkness or "no-view" is present in these optics. As a consequence, the illumination of activated LED 308 may be observed at its mounting point 334. Note that the mount 334 of LED 308 is within rear wall 12 in an orientation displaced from optics 52. The illumination from the LED is very readily perceptible to the operator at eye station 332, particularly as a consequence of the continued closure of the exposure mechanism of camera 10. Through the use of such programmed logic for the photographic cycle, it becomes unnecessary to mount warning devices within the optical path of the viewing-focusing system itself. The convenience for such design latitude will be apparent.

Returning to FIGS. 4 and 5, as revealed at block 272, simultaneously with the depression of switch $S_1$, an evaluation timing network shown generally at 340 in FIG. 4 is activated. In this regard, an SCR 342 is gated from along line 280 through resistor 344. Network 340 additionally receives power from main power line 180 through lines 260 and 350. The cathode side of SCR 342 is coupled to ground, while its anode terminal is connected through line 352 to the emitter terminal of NPN transistor $Q_7$. The collector of transistor $Q_7$ is connected through resistor 354 and line 356 to the base of PNP transistor $Q_8$. Transistor $Q_7$ is biased forwardly into conduction as a consequence of the connection of its base through line 358, resistors 360 and 362 to power input lead 280. Inasmuch as lead 280 extends to line 188, this "on" status of transistor $Q_7$ obtains only as long as the camera operator depresses switch $S_1$.

The emitter of transistor $Q_8$ is coupled through line 361 to line 350, while its collector is coupled through line 362 to line 364. Line 364 extends, in turn, through resistor 366 to line 368. Line 368 connects the collector of NPN transistor $Q_9$ through resistor 370 to power line 350. The emitter of transistor $Q_9$ is coupled through line 372 and resistor 374 to line 376 which, in turn, is connected through line 352 to the anode side of SCR 342. The base of transistor $Q_9$ is connected to line 378 which, in turn, connects the collector electrode of NPN transistor $Q_{10}$ through resistor 380 to power input line 350. The emitter of transistor $Q_{10}$ is coupled through line 382 to line 372 and the resultant common emitter coupling of transistors $Q_9$ and $Q_{10}$ provides a Schmitt-type triggering circuit in which the output stage thereof at transistor $Q_9$ is normally forwardly biased by virtue of its connection through line 378 to line 350 and the input stage thereof at transistor $Q_{10}$ is normally non-conducting, or off. The base of transistor $Q_{10}$ is connected by line 384 to a point within line 350 intermediate capacitor 386 and timing resistor 388. Forming an R-C timing network, capacitor 386 and resistor 388 serve to develop a voltage at line 384 reaching a threshold triggering value providing for the forward biasing of transistor $Q_{10}$ at the end of a predetermined evaluation interval. As noted earlier, this interval may be selected as about 5 seconds. The R-C network is activated upon removal of a shunt imposed across capacitor 386 by forwardly biased NPN transistor $Q_{11}$. The shunt path provided by transistor $Q_{11}$ includes line 390 connecting the collector thereof with line 384 and line 376 connected with the emitter thereof. The base of transistor $Q_{11}$ is connected through resistor 394 and line 396 to line 358. Accordingly, transistor $Q_{11}$ remains forward biased as long as switch $S_1$ remains, i.e., is held, closed.

With the arrangement shown, an initial gating of SCR 342 occasioned with the depression of switch $S_1$ serves to provide a clamping function for network 340 in which transistor $Q_8$ remains forwardly biased as well as output stage transistor $Q_9$ of the Schmitt trigger, even though switch $S_1$ later is released.

When forwardly biased, transistor $Q_8$ serves to hold off PNP transistor $Q_{12}$. The collector of transistor $Q_{12}$ is coupled through resistor 398 and line 400 to line 402. Line 402, in turn, extends to line 316 and the base of transistor $Q_5$. Transistors $Q_{12}$ and $Q_5$ are arranged such that during the instant portion of a photographic cycle they are held off in correspondence. Transistor $Q_5$ is off at this time inasmuch as line 320 extending from line 316 and the base thereof is coupled to line 264 at a point above switch $S_5$ which is closed at the commencement of a photographic cycle.

As shown at block 406 in FIG. 5, upon observing the low light level warning as at block 328, the operator releases switch $S_1$. With such release, the forward bias of transistor $Q_7$ is removed as well as that at shunting transistor $Q_{11}$. SCR 342 continues to conduct and permit the activation of network 340 as a consequence of its latching characteristic and the R-C network including capacitor 386 and resistor 388 commences to time-out a 5 second evaluation interval.

Additionally, with the removal of forward bias at transistor $Q_7$, transistor $Q_8$ is turned off, thereby permitting transistor $Q_{12}$ to be drawn into conduction. As transistor $Q_{12}$ conducts, a forward bias is asserted across the base emitter junction of transistor $Q_5$, thereby turning it on. As transistor $Q_5$ turns on, the bias at transistor $Q_6$ is removed to turn it off and thereby the de-activate diverting line 326. GATE C is now enabled to assert a high logic signal along its output line 252 to motor control function 258.

When forward biased, transistor $Q_{12}$ also serves to assert a forward bias at transistor $Q_{13}$ by virtue of the connection of the collector of transistor $Q_{12}$ through line 408 and bias resistor 410 to the base of the latter. The emitter of transistor $Q_{13}$ is coupled with line 376, while its collector is coupled with line 358, leading in turn, to the base of transistor $Q_7$. As is apparent, while transistor $Q_{13}$ is on transistor $Q_7$ is held off to, in turn, hold transistor $Q_8$ off. A capacitor 412 is inserted between line 376 and line 408 leading to the base of transistor $Q_{13}$. This capacitor inserts a slight time delay in the forward biasing of transistor $Q_{13}$ to accommodate for a condition wherein transistor $Q_{13}$ might be turned on before transistor $Q_7$. Such a race condition thereby is eliminated with respect to transistors $Q_{13}$, $Q_7$ and $Q_{12}$.

As depicted in FIG. 5, with the above-described logic conditions in effect, transistor $Q_5$ serves to override the motor inhibit operation of transistor $Q_6$ as shown at block 414, the R-C network including resistor 388 and capacitor 386 serves to provide a 5 second timing function in connection with the Schmitt trigger incorporating transistors $Q_9$ and $Q_{10}$ as shown in block 416 and the remaining portion of the photographic control circuit is shut down by virtue of the release of switch $S_1$ before the activation of latching function 190 as shown at block 418. Concerning the latter shut-down, however, the continued conduction of SCR 342 permits appropriate logic components within network 340 to continue to function so as to provide an appropriate evaluation interval.

During the ensuing scene lighting evaluation made on the part of the camera operator, a determination may be made not to complete the exposure. Under such circumstances, the control system is not commanded to carry out a time exposure and switch $S_1$ is not re-depressed. As shown in FIG. 5, within the dashed boundary defining block 420, the exposure evaluation network will de-activate following a 5 second time-out. In this regard, as the triggering level of the Schmitt trigger is reached by the timing network including resistor 388 and capacitor 386, transister $Q_{10}$ is forwardly biased into conduction, to, in turn, remove the forward bias at transistor $Q_9$. As transistor $Q_9$ is turned off, transistor $Q_{12}$ is turned off. In further consequence, SCR 342 is turned off inasmuch as current flow thereinto drops below an adequate sustaining level. As a consequence, the entire system is shut down, no drains being imposed upon battery power supply 178.

As shown in block 422 in FIG. 5, should the operator of the camera determine to make a timed exposure within the predetermined five second interval of scene brightness evaluation, switch $S_1$ again is closed within the interval. As is readily apparent for cameras of the type having two actuating switches, the second switch (not shown) would be actuated in order to make the timed disclosure within the predetermined five second interval. With this second actuation of switch $S_1$, however, transistor $Q_7$ is not forward biased or turned on inasmuch as transistor $Q_{13}$ remains on during the interval of evaluation to divert biasing current from line 358. Since transistor $Q_7$ remains off, transistor $Q_8$ remains off and transistor $Q_{12}$ remains on. As a consequence of transistor $Q_{12}$ remaining on, transistor $Q_5$ continues to be forward biased to remove forward bias at transistor $Q_6$. Accordingly, the motor inhibiting function of transistor $Q_6$ is overridden. The control system now is permitted to carry out a complete photographic cycle. As shown in block 424 in FIG. 5, and discussed above in connection with Event No. 1 in FIG. 6, the outputs of GATES A and B respectively assume 1 and 0 values to forward bias transistor $Q_1$ and energize winding 84'. Output $t_3$ of GATE C remains at 0 to maintain motor 110 in a de-energized state. Exposure mechanism blades 60 and 62 are driven toward a fully closed orientation, at which point the contacts of switch $S_4$ transfer to derive a C-B condition. As noted at Event No. 2 in FIG. 6, this condition for switch $S_4$ alters the $b$ input terminal state at line 218 from a low to a high to, in turn, cause the output $t_1$ of GATE A to become low. The forward bias at transistor $Q_1$ is removed and the power-down energization of winding 84' ensues.

Figure 5A:
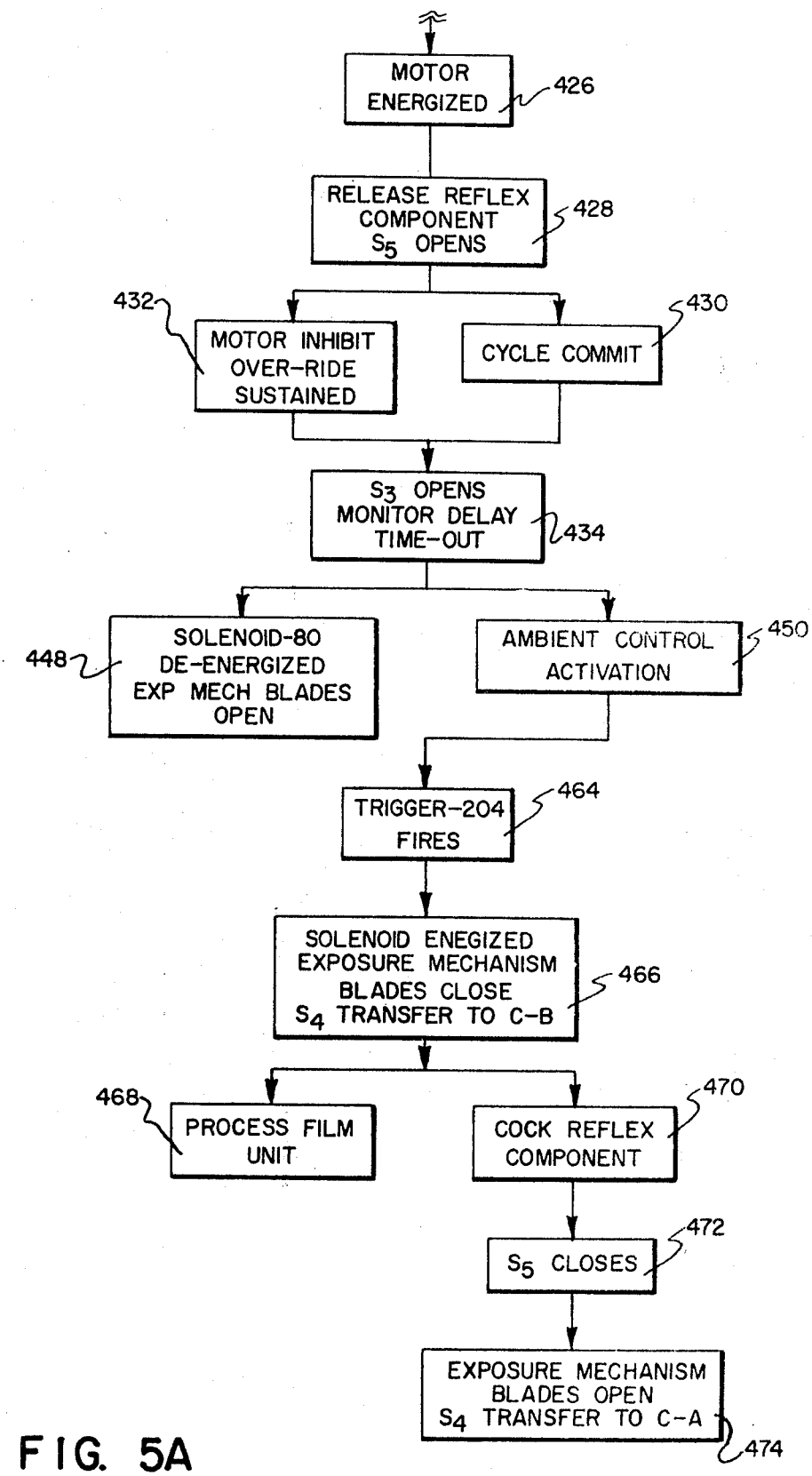

The transfer of switch $S_4$ to a C-B condition, as before, also alters the output $t_3$ of GATE C from 0 to 1. However, the inhibit function heretofore asserted from transistor $Q_6$ through line 326 is no longer active and motor control 258 carries out the energization of motor 110. As motor 110 is energized, gear train 112 commences to rotate cycle phase cam 114. This energization is represented in FIG. 5A at block 426. As described in connection with FIG. 3, such rotation continues until ram 118 is released to cause the opening of switch $S_5$. Switch $S_5$ is identified in FIG. 2 as selectively coupling lines 264 and 256. As a consequence of the connection of line 264 above switch $S_5$ with line 320, the opening of the switch assures the continued forward biasing of transistor $Q_5$ to, in turn, continue the holding off of transistor $Q_6$.

As disclosed at Event No. 3 in FIG. 6, the status of input terminal $d$ of GATE C alters to a high condition in response to the opening of switch $S_5$. This alteration, in turn, serves to change the output $t_3$ of GATE C to a low state. Motor control function 258 de-energizes and brakes motor 110. As depicted at block 428 in FIG. 5A, as ram 118 is driven forwardly, reflex component 50 is spring driven toward its exposure orientation against the back wall of camera 10.

The alteration of the status of common input terminal $d$ additionally provides for the insertion of a signal into latching network 190 causing it to assume its second energization state. Such signal insertion is provided in consequence of the connection of latching network 190 through lines 266 and 268 to line 264. This latching commitment of the control system to completion of a photographic cycle is represented in FIG. 5A at block 430, while the continuation of overriding the inhibition function performed by transistor $Q_6$ is represented at block 432.

As shown at block 434 in FIG. 5A and represented at Event No. 4 in FIG. 6, as reflex component 50 is elevated through about 32° of rotation, switch $S_3$ is opened. The technique for such opening actuation has been described in connection with FIG. 3 and the resultant logic input serves to activate an R-C timing network indentified generally at 436. Formed of a timing resistor 438 and a timing capacitor 440 coupled within line 442 to ground, network 436 serves to delay the commencement of the exposure phase of a photographic cycle. This delay is selected in accordance with a time constant sufficient to permit reflex component 50 to fully seat at its exposure position. Network 436 is activated upon removal of a shunt about capacitor 440 which is constituted by a line 444 connected from a point intermediate capacitor 440 and resistor 438 at input line 238 to ground through a diode 446 and switch $S_3$.

When delay network 436 attains the requsite threshold level of trigger 236, the output thereof at line 234 converts from a low state to a high state. As described in conjunction with function blocks 448 and 450 in FIG. 5A and shown at Event No. 5 in FIG. 6, the high state as introduced from lines 234, 232 and 230, simultaneously alters the state of all common gate inputs $c$ to a high status. Such alteration changes the output $t_2$ of GATE B to a high state, thereby abruptly terminating current flow in line 244 with the consequence of de-energizing the excitation winding 84' of solenoid 80. With this de-energization, blades 60 and 62 commence to open under the bias of spring 82. As blades 60 and 62 move from their blocking terminal positions, switch $S_4$ reassumes its condition C-B. In addition to effecting the de-energization of excitation winding 84', the high signal at lines 234 and 232 also activates ambient control function 216. Ambient control 216 is powered through line 452 from power lead 194 and is coupled to ground through line 454. As described earlier, control 216 includes photosensing elements which operate in conjunction with amplification stages and comparitors which develop an output at line 214 following an interval of time derived in correspondence with the exposure valuation of scene brightness levels. Several configurations for control function 216 are available, for instance as described in U.S. Pat. Nos. 3,641,891 and 3,620,143. The high signal at lines 234 and 232 also activates an exposure limit network shown generally at 456. Coupled to line 232 from line 458 and to trigger 204 from line 460, network 456 serves to impose a limit on the interval of time which the system may develop in carrying out an extended or time exposure. This interval may, for instance, be about 20 seconds. At the termination of such interval, a high value is developed by network 456 at line 460 which serves to fire trigger 204. With such an arrangement, accidental or uninformed time exposures which otherwise would drain battery 178 to ineffectiveness are avoided.

When an appropriate time exposure interval has substantially ended, control 216 developes a high signal at line 214 having a value at least equal to the threshold or trigger signal level of trigger 204. Upon receipt of such signal, trigger 204 fires to present a high signal at output line 202. This incident is shown in FIG. 5A at block 464 and is represented at Event No. 6 in FIG. 6. The high output at line 202 alters the status of common gate input terminals $a$ to a corresponding high status. As a consequence, the outputs of GATES A and B are inverted. For instance, output $t_1$ of GATE A is changed to a high status and output $t_2$ of GATE B is changed to a low status. A high output at line 240 serves to forward bias the base-emitter junction of transistor $Q_1$, thereby energizing solenoid winding 84' from line 244. Solenoid 80 commences to retract plunger 90 to, in turn, drive exposure mechanism blades 60 and 62 into a closed orientation. As shown at Event No. 7 in FIG. 6 and at block 466 in FIG. 5A, as blades 60 and 62 reach a closed orientation, switch $S_4$ transfers to a C-B orientation. This alteration of the switch converts the status of input terminals $b$ at GATES A and C from a low to a high state. As before, GATE A output $t_1$ resumes a low value to remove the forward bias at transistor $Q_1$ and permit energization of solenoid winding 84' at a lower power-down value. Additionally, this common input "c" alteration changes the output $t_3$ of GATE C to a high status which, in the absence of inhibition from transistor $Q_6$ serves to activate motor control 258. Inasmuch as switch $S_5$ remains open during this portion of a photographic cycle, transistor $Q_5$ remains forwardly biased and, in turn, transistor $Q_6$ is held off. Motor control function 258 energizes motor 110.

With such energization, the control system is caused to progress through its post-exposure phase during which, as shown at blocks 468 and 470 of FIG. 5A, an exposed film unit is processed and reflex component 50 is driven toward its position covering the exposure plane of camera 10.

As is depicted at Event No. 8 in FIG. 6 and shown at block 472 in FIG. 5A, when reflex component 50 reaches its exposure plane covering orientation, switch $S_5$ is closed. Thus closed, switch $S_5$ serves to shut down the entire system including the de-energization of winding 84' and de-energization of motor 110. In consequence, as shown at block 474 in FIG. 5A, exposure mechanism blades 60 and 62 are driven by opening spring 82 into their fully open orientation. Note that switch $S_5$ reassumed its closed or initial position only at the termination of a given photographic cycle.

A significant number of time exposures may be made at exposure intervals of less than about 5 seconds. For some applications, it additionally may be desirable to make a rapid sequence of such relatively short (1-2 second) exposures and, with the automatic camera 10 described herein, such sequential photographic cycles are available.

To accommodate the low light level feature of the invention to such sequential cycle performance, a minor modification may be provided in network 340. For instance, line 396 may be extended as at 396' for connection with line 280. As a result, the R-C network including capacitor 386 and resistor 388 is reset with each successive depression of switch $S_1$ to re-activate the inhibit override feature of the invention. Note that a depression of switch $S_1$ will re-assert a forward bias at transistor $Q_{11}$ and a release of that switch will remove such bias.

Looking momentarily to FIG. 1, when camera 10 is operated in a flash operational mode, flash array 160 is mounted such that the blade 162 thereof is inserted within mount 164 upon exposure housing 16. As described earlier, one conducting surface of blade 162 serves to close circuit contacts within the control system of camera 10. This switching activity may be represented in FIG. 4 as the closure of a switch designated $S_2$. When closed, switch $S_2$ connects line 266 including resistor 480 with line 482 including resistor 484 to ground. Accordingly, with the arrangement shown, as switch $S_2$ is closed, a high signal is developed at line 486 connecting line 482 with a flash exposure system shown generally at block 488. Enabled from line 196 through line 490 and coupled to ground through line 492, flash exposure system 488 provides a focus-responsive form of control over the definition of exposure value provided by exposure mechanism blades 60 and 62. The system is described and claimed in detail in U.S. Pat. No. 3,750,543 as well as in copending applications for U.S. patent application Ser. No. 341,730, by L. M. Douglas, filed Mar. 15, 1973 and Ser. No. 246,891 (now abandoned) by J. P. Burgarella, P. P. Garcia and R. C. Kee entitled "Flash Photographic Control System", filed Apr. 24, 1972, both assigned in common herewith.

As shown at block 494 in FIG. 5, where switch $S_2$ is closed at the very commencement of a photographic cycle, both the low light level detection feature as well as the ambient control arrangement of the invention are overridden. Ambient control 216 is overridden by virtue of a signal input thereto from system 488 represented by line 496. Similarly, closure of switch $S_2$ connects line 302 with ground to prevent the assertion of a forward bias at transistor $Q_3$. When transistor $Q_3$ is off, transistor $Q_4$ is off and, in consequence, transistor $Q_6$ is off. Accordingly, the low light level detect feature as well as the motor control inhibit feature of the control system are overridden upon the mounting of array 160 on camera 10.

In general, a flash photographic cycle is similar to an ambient one, the exposure mechanism blades initially being driven closed as depicted at block 424 in FIG. 5, motor 110 then being energized as shown at block 426 in FIG. 5A and reflex component 50 being released as shown at block 428. With the opening of switch $S_5$, the control system is committed to the completion of a cycle as described at block 430 and, with the opening of switch $S_3$, monitor delay time-out takes place as described in connection with block 434. The conclusion of this time-out is represented as a high signal at line 234 emanating from trigger 236. The high signal is introduced to flash exposure system 488 through line 498. System 488 responds to this signal input to override ambient control 216 through line 496 and to cause exposure mechanism blades 60 and 62 to define a focus-responsive aperture value. When such exposure mechanism blade setting has been carried out, a flash selection and firing circuit enabled from line 500 ignites a select one of the flashlamps within array 160. At the conclusion of a delay representing the ignition and burning time of the selected flashlamp, system 488 imposes a high signal through line 502 to the input of trigger 204. The control cycle then continues identically as disclosed in FIG. 5A in connection with blocks 464–474.

As shown at block 504 in FIG. 5, array 160 also may be inserted as part of the evaluation performed during the five second time-out to evaluate scene lighting. Under such conditions, the flash system will operate identically as discussed above in connection with block 494.

Looking to FIGS. 4, 5 and 7, the dark slide ejection feature of camera 10 is revealed, particularly, as that feature inter-relates to the low light level detect and inhibit arrangement of the instant invention. The dark slide ejection feature of the camera is described in detail and claimed in U.S. Pat. No. 3,750,551.

As shown at block 506 in FIG. 5 and described as Event No. 1 in FIG. 7, when cassette 32 is inserted into the receiving chamber of an erected camera 10, switch $S_7$ will have been closed and when loading door 170 is closed, a switch designated $S_6$ in FIG. 4 is closed thus putting the camera in operative position. Switch $S_6$ is located within line 508 and extends from main power line 180 across switch $S_1$ and through line 510 to latch 190. When closed, switch $S_6$ immediately commits the control system to carry out an automatic dark slide ejection cycle as represented at block 512 in FIG. 5. This is accomplished by asserting a high value from line 510 to line 514, one side of which is coupled with input "e" of GATE D. Simultaneously, the control circuit is energized in identical fashion as the energization commencing a normal photographic cycle. In this regard, the inputs at GATES A and B are energized such that output $t_1$ of GATE A assumes a high value to forward bias transistor $Q_1$ and energize winding 84' of solenoid 80. As shown as Event No. 2 in FIG. 7, exposure mechanism blades 60 and 62 are driven closed and, upon such closure, a resultant transfer of switch $S_4$ to condition C-B causes output $t_3$ of GATE C at line 252 to assume a high value.

As is depicted at block 516 in FIG. 5, both the flash system and the low light level detection system of the circuit simultaneously are suppressed with the development of a high value at line 514. Note in this regard, that line 508 is coupled through line 518, resistor 520 and line 316 to the base of transistor $Q_5$. The value at this line being high, transistor $Q_5$ is forward biased, to prevent the assertion of forward bias at transistor $Q_6$. As a consequence, the high signal at output line 252 of GATE C is permitted to pass to the motor control function 258. Motor 110 is energized to release ram 118 and, in consequence, reflex component 50 as in the case of a typical photographic cycle.

The high signal at line 514 also is presented through line 520 to the base of NPN transistor $Q_{14}$. The collector of transistor $Q_{14}$ is coupled to line 482 between switch $S_2$ and resistor 484, while its emitter is connected with ground. Accordingly, the transistor is forward biased in response to the closure of switch $S_6$ and serves to prevent the assertion of an enabling signal through line 486 to flash exposure system 488. System 488 thereby is overridden.

As shown at Event No. 3 in FIG. 7, as switch $S_5$ is opened, common input $d$ assumes a high value and is presented to GATE C through line 254 and to GATE D through line 522. Common input $b$ remaining high, output $t_4$ of GATE D at line 524 assumes a high value. Line 524 extends through diode 526 to the input of trigger 204. As shown at Event No. 4 of FIG. 7, trigger 204 reacts to this high signal to develop a high output at line 202. Accordingly, winding 84' remains energized, while output $t_3$ of GATE C immediately resumes a high value. Motor control 258 carries out the continued energization of motor 110. Reflex component 50 is driven to its initial viewing-focusing orientation and the dark slide is removed from cassette 32 by pick mechanism 40 and processing station 132.

As shown at Event No. 6 in FIG. 7, as switch $S_3$ is closed with the energization of motor 110, switch $S_6$ is opened by a mechanism revealed in the noted U.S. Pat. No. 3,750,551 to return common input $e$ to a low value. The mechanism providing for the opening of switch $S_6$ preferably is one reacting to the operation of a film utilization counter. At the time of opening switch $S_6$, switch $S_5$ will have been open to provide for the continued forward biasing of transistor $Q_5$ through line 320. Accordingly, the low light level detection and inhibit system of the invention continues to be overridden. Finally, as shown at Event No. 7 in FIG. 7, with the closure of switch $S_5$, the dark slide ejection cycle is concluded and camera 10 will perform a conventional photographic cycle upon the next actuation of switch $S_1$.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. In an exposure control system actuable to automatically carry out a photographic exposure cycle effecting the exposure of photographic material in accordance with the brightness level of a scene, the improvement comprising:
    detector means responsive to said scene brightness and having a signal condition in the presence of levels of brightness below a predetermined level;
    selectively engageable inhibit means responsive to said signal condition for preventing the carrying out of a said exposure cycle when enabled upon actuation of said system; and override means for suppressing said inhibit means enablement for a predetermined interval of time following an initial said actuation of said system.

2. The exposure control system of claim 1 further comprising indicator means energizable in response to said detector means signal condition for providing a perceptible low light level signal.

3. The exposure control system of claim 1 in which said override means predetermined interval is selected as about 5 seconds.

4. The exposure control system of claim 1 in which said override means includes means responsive to a subsequent actuation of said system after said initial actuation and within said predetermined time interval for continuing said suppression of said inhibit means enablement throughout said cycle.

5. The exposure control system of claim 1 in which:
said override means includes timer means energizable to derive an output state for an interval corresponding with said predetermined interval;
latch means responsive to said initial actuation for effecting the energization of said timer means during said interval; and
means responsive to said output state for suppressing said inhibit means enablement.

6. The exposure control system of claim 5 in which said timer means includes reset means responsive to said initial actuation of said system for effecting said actuation response of said timer means and responsive to subsequent said actuations within a said predetermined interval to cause said timer means to re-initiate a said interval.

7. In an exposure control system of a variety operative in ambient or transient illumination modes and actuable in said ambient mode to automatically carry out a photographic exposure cycle in accordance with the brightness level of a scene, the improvement comprising:
detector means responsive to said scene brightness and having a signal condition in the presence of levels of brightness below a predetermined level;
selectively enableable inhibit means responsive to said signal condition for preventing the carrying out of a said exposure cycle when enabled upon actuation of said system;
override means for suppressing said inhibit means enablement for a predetermined interval of time following an initial said actuation of said system; and
mode responsive means for suppressing said inhibit means enablement when said control system is operated in said transient illumination mode.

8. The exposure control system of claim 7 further comprising indicator means energizable in response to said detector means signal condition for providing a perceptible low light level signal.

9. The exposure control system of claim 7 further comprising indicator means energizable in response to said detector means signal condition for providing a perceptible low light level signal, and said mode responsive means is operative to suppress said indicator means energization when said control system is operated in said transient illumination mode.

10. In an exposure control system of a variety including switch means initially actuable to assume a first circuit condition from a second circuit condition to effect the commencement of a photographic cycle and first latch means for selectively committing said system to the carrying out of said cycle in the presence of said second circuit condition of said switch means, said cycle including the operational event of controlling the exposure of photographic material in accordance with the brightness level of a scene, the improvement comprising:
detector means responsive to scene brightness and having a unique signal condition when said scene brightness level is below a predetermined level;
inhibit means responsive to said first circuit condition at said switch means initial actuation for inhibiting the continuation of said photographic cycle in the presence of said unique signal condition; and
override means for suppressing said inhibit means inhibition of said cycle performance for a predetermined interval of time when said switch means assumes said second circuit condition.

11. The exposure control system of claim 10 wherein said improvement further comprises indicator means energizable in response to said detector means unique signal condition for providing a perceptible signal.

12. The exposure control system of claim 10 in which said override means predetermined interval is selected as about five seconds.

13. The exposure control system of claim 10 in which said override means includes:
timer means having a predetermined output state for an interval corresponding with said predetermined interval when energized and when said switch means assumes said second circuit condition;
second latch means responsive to said switch means initial actuation first circuit condition for effecting the energization of said timer means during said interval; and
suppressor means selectively responsive to said predetermined output state for suppressing said inhibit means.

14. The exposure control system of claim 13 in which said timer means comprises:
reset means responsive to said switch means first circuit condition to assert a reset condition and responsive to said switch means second circuit condition to effect removal of said reset condition.
timing network means operative when activated by removal of said reset condition imposed thereupon to derive a predetermined signal condition in an interval of time corresponding with said predetermined interval; and
trigger means normally deriving said predetermined output state when said timer means is energized and having another output state in response to said timing network state predetermined signal condition.

15. The exposure control system of claim 14 in which said second latch means is responsive to said trigger means other output state for de-energizing said timer means.

16. The exposure control system of claim 10 in which said override means is operative to continue said suppression of said inhibit means inhibition when said first latch means has committed said system to the carrying out of said cycle.

17. In reflex photographic apparatus of a variety including drive means actuable for effecting the conversion of an optical path between viewing and exposure orientations, exposure regulating means selectively actuable to block and unblock said optical path and operative to automatically control the exposure of photographic material in accordance with the brightness level of a scene, start switch means actuable to assume a first circuit condition from a second circuit condition and being normally biased to assume said second circuit condition, transducer means having a first condition at the commencement of a photographic cycle of said apparatus and a second condition commencing thereafter when said optical path converts to said exposure orientation, and first latch means responsive to said transducer means second condition for committing said apparatus to the automatic completion of said photographic cycle, the improvement comprising:

detector means responsive to scene brightness and having a signal condition in the presence of levels of scene brightness below a predetermined level;
  inhibit means responsive to said switch means actuation into said first circuit condition and to said detector means signal condition for inhibiting the said actuation of said drive means; and
  override means responsive to said switch means assumption of said second circuit condition from said first circuit condition for suppressing said inhibit means inhibition of said drive means actuation for a predetermined interval of time.

18. The improved apparatus of claim 17 further comprising indicator means energizable in response to said detector means signal condition for providing a perceptible low light level signal.

19. The improved apparatus of claim 17 in which said override means predetermined interval is selected as about five seconds.

20. The improved apparatus of claim 17 in which said override means is responsive to said transducer means second condition for continuing the said suppression of said inhibit means inhibition of said drive means actuation throughout a said photographic cycle.

21. The improved apparatus of claim 17 in which said override means includes:

timer means energizable to have a first output state and responsive to said switch means assumption of said second circuit condition from said first circuit condition for deriving a second output state following said predetermined interval of time;
  second latch means responsive to said switch means actuation into said first circuit condition for effecting the energization of said timer means; and
  suppressor means responsive to said timer means first output state for suppressing said inhibit means inhibition of said drive means actuation.

22. The improved apparatus of claim 21 in which said second latch means is responsive to said timer means second output state for de-energizing said timer means.

23. The improved apparatus of claim 21 in which said timer means comprises:

reset means responsive to said switch means first circuit condition to assert a reset condition and responsive to said switch means second circuit condition to effect removal of said reset condition;
  timing network means operative when actuated by removal of said reset condition imposed thereon to derive a predetermined signal condition in an interval of time corresponding with said predetermined interval; and
  trigger means normally having said first output state when said timer means is energized and assuming said second output state in response to said timing network means predetermined signal condition.

24. The improved apparatus of claim 23 in which said second latch means is responsive to said trigger means second output state for de-energizing said timer means.

25. In reflex photographic apparatus of a variety including drive means actuable for effecting the conversion of an optical path between viewing and exposure orientations, exposure regulating means selectively actuable to block and unblock said optical path and operative to automatically control the exposure of a photographic material in accordance with the brightness level of a scene, reflex viewing means operative as a component within said optical path in said viewing orientation for viewing and framing a scene to be photographed, start switch means initially actuable to assume a first circuit condition from a second circuit condition to effect the commencement of a photographic cycle and first latch means for selectively committing said system to the carrying out of said cycle, the improvement comprising:

detector means responsive to scene brightness and having a signal condition in the presence of levels of scene brightness below a predetermined level;
  inhibit means responsive to said start switch means actuation into said first circuit condition and to said detector means signal condition for inhibiting the said actuation of said drive means following an initial actuation of said exposure regulating means blocking said optical path;
  override means responsive to said switch means assumption of said second circuit condition from said first circuit condition for suppressing said inhibit means inhibition of said drive means actuation for a predetermined interval of time; and
  indicator means energizable to provide a perceptible light signal in response to said detector means signal condition.

26. The photographic apparatus of claim 25 in which said override means predetermined interval is selected as about five seconds.

27. The photographic apparatus of claim 25 in which said indicator means is mounted upon said apparatus in a position adjacent said reflex viewing means.

28. The photographic apparatus of claim 25 in which said override means includes:

timer means having a predetermined output state for an interval corresponding with said predetermined interval when energized and when said switch means assumes said second circuit condition;
  second latch means responsive to said switch means initial actuation first circuit condition for effecting the energization of said timer means during said interval; and
  suppressor means selectively responsive to said predetermined output state for suppressing said inhibit means.

29. The photographic apparatus of claim 28 in which said timer means comprises:

reset means responsive to said switch means first circuit condition to assert a reset condition and responsive to said switch means second circuit condition to effect removal of said reset condition;
  timing network means operative when activated by removal of said reset condition imposed thereupon to derive a predetermined signal condition in an interval of time corresponding with said predetermined interval;

trigger means normally deriving said predetermined output state when said timer means is energized and having another output state in response to said timing network state predetermined signal condition.

30. The photographic apparatus of claim 29 in which said second latch means is responsive to said trigger means other output state for de-energizing said timer means.

31. The photographic apparatus of claim 25 in which said override means is operative to continue said suppression of said inhibit means inhibition when said first latch means has committed said system to the carrying out of said cycle.

32. A photographic exposure control system comprising:
- a manual actuable member;
- first means for detecting levels of scene brightness;
- second selectively operative means for carrying out an exposure cycle effecting the exposure of photographic material; and
- third means responsive to a first manual actuation of said member for rendering said second means operative in the presence of scene light above a predetermined brightness level as detected by said first means and responsive to a second manual actuation of said member in the presence of scene light below a predetermined brightness level as detected by said first means for rendering said second means operative within a predetermined period of time following the first manual actuation of said member, said system thus serving to automatically preclude the exposure of photographic material in the presence of levels of scene brightness below said predetermined level unless there is provided the second manual actuation of said member within said predetermined time following the first manual operation of said member.

33. A photographic camera for use with a film cassette, said camera including:
- a housing including means for positioning the cassette for exposure operations;
- means responsive to the positioning of the cassette within said housing for automatically effecting a predetermined operation;
- a manually actuable member;
- means, normally responsive to the operation of said manually actuable member when such a cassette is operatively positioned within said housing for effecting a complete predetermined photographic cycle, said complete predetermined photographic cycle including said predetermined operation;
- means for selectively providing a predetermined signal condition; and
- means responsive to said predetermined signal condition, for rendering said photographic cycle effecting means non-responsive to actuations of said manually actuable means to effect said complete predetermined photographic cycle without affecting the normal response capability of said means for effecting said predetermined operation.

34. The photographic camera of claim 33 wherein:
the means for effecting the complete photographic cycle includes means for providing a series of control signals,
and the means for rendering said photographic cycle effecting means non-responsive includes inhibiting means which responds to said predetermined signal by effectively rendering at least one control signal inoperative together with means for removing the inoperative effect rendered by said inhibiting means for sufficient time to permit said one control signal to effect said predetermined operation in response to said positioning of said cassette within said housing.

35. A photographic camera for use with a film cassette including means defining an exposure aperture and means defining an exit aperture, the cassette initially retaining at least one film unit and a dark slide aligned with the cassette exit aperture and interposed between the film unit and the exposure aperture, the cassette including means for displacing the film unit into the position originally occupied by the dark slide upon the dark slide's being advanced from the cassette through its exit aperture, said camera including:
- a housing;
- means for mounting such a cassette within said housing with its dark slide disposed at the exposure plane of said camera;
- an advancement mechanism arranged to be disposed in operative relationship with the dark slide when such a cassette is initially located in said mounting means and selectively operative to advance the dark slide from the cassette through its exit aperture, said advancement mechanism being subsequently selectively operative to advance the film unit from the cassette through its exit aperture;
- motor means, normally responsive to the operative positioning of such a cassette within said housing in said cassette mounting means, for automatically actuating said advancement mechanism to effect the advancement of the darkslide from the cassette through its exit aperture;
- a manually actuable member;
- means, normally responsive to the operation of said manually actuable member when such a cassette is operatively positioned within said housing in said cassette mounting means, for effecting a complete predetermined photographic cycle, said complete predetermined cycle including the operation of said motor means;
- means for selectively providing a predetermined signal condition; and
- means, responsive to said predetermined signal condition, for rendering said photographic cycle effecting means non-responsive to actuations of said manually actuable member to effect the operation of said motor means without affecting the normal response capability of said motor means to an operative positioning of such a cassette within said housing in said cassette mounting means.

36. The photographic camera of claim 35 wherein:
said means for effecting the complete photographic cycle includes means for providing a control signal to operate said motor means,
and said means for rendering said photographic cycle effecting means non-responsive includes inhibiting means which responds to said predetermined signal by effectively rendering the control signal to said motor means inoperative together with means for removing the inoperative effect rendered by said inhibiting means for sufficient time to permit said control signal to effect the normal response capability of said motor means in response to an operative positioning of such a cassette within said housing in order to fully eject said dark slide from said camera apparatus regardless of said predetermined signal condition.

37. A photographic apparatus of the type having a receiving chamber for receipt of a photographic cassette having a light entrance portion thereof together with means for slidably retaining a dark slide in light blocking relation to at least one film unit disposed within said cassette; said apparatus also having an operative condition in which actuation of said apparatus operates to automatically carry out a photographic exposure of a single said film unit together with an ejection of said film unit from said photographic apparatus and wherein said photographic apparatus further includes means for automatically completing the ejection of said dark slide from said apparatus when said photographic apparatus assumes the operative condition subsequent to the insertion of the photographic cassette into said chamber, said photographic apparatus further comprising:

means for selectively providing a predetermined signal condition;
preventing means responsive to said predetermined signal condition for ultimately preventing the ejection of either said dark slide or film unit when said photographic apparatus is in the operative condition; and
means for disabling the ultimate preventing effect of said preventing means in order to complete the ejection of said dark slide in response to the photographic apparatus assuming the operative condition subsequent to the insertion of a photographic cassette into said chamber regardless of the presence of said predetermined signal condition.

38. The exposure control system of claim 32 including means responsive to the operative association of a source of artificial light with said system for rendering said second means operative in response to each manual actuation of said member and for rendering said third means inoperative.

* * * * *